Figure 1:
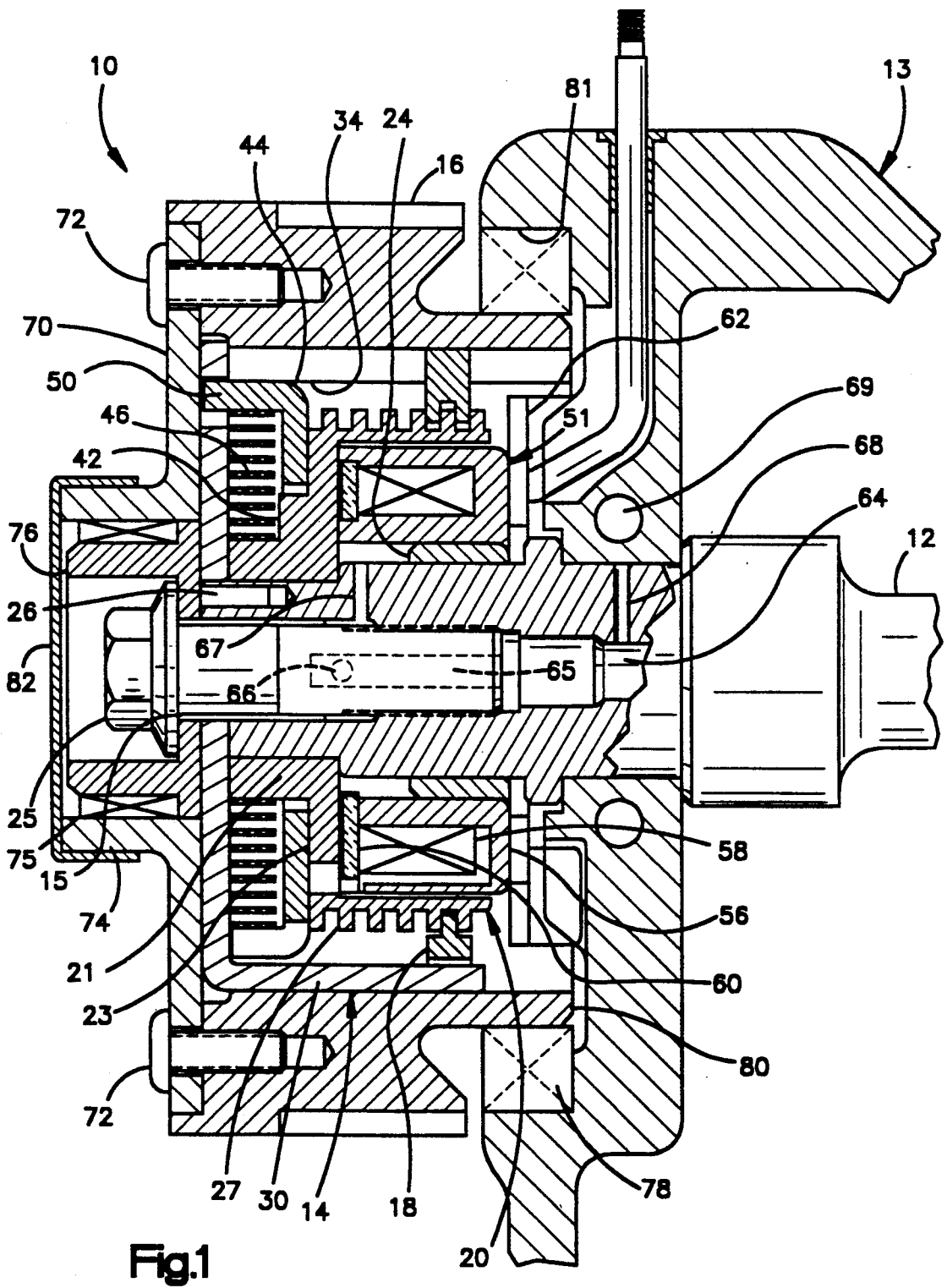

United States Patent [19]

Brune et al.

[11] Patent Number: 5,097,804
[45] Date of Patent: Mar. 24, 1992

[54] PHASE CHANGE DEVICE

[75] Inventors: John E. Brune, Parma; Darryl J. Muir, Bellevue, both of Mich.

[73] Assignee: Eaton Corporation, Cleveland, Ohio

[21] Appl. No.: 687,155

[22] Filed: Apr. 18, 1991

[51] Int. Cl.⁵ ............................................. F01L 1/34
[52] U.S. Cl. .............................. 123/90.17; 123/90.31; 123/90.37; 464/2
[58] Field of Search ............... 123/90.15, 90.17, 90.31, 123/90.37; 464/2

[56] References Cited

U.S. PATENT DOCUMENTS

| 4,754,727 | 7/1988 | Hampton | 123/90.15 |
| 4,841,924 | 6/1989 | Hampton et al. | 123/90.15 |
| 5,031,585 | 7/1991 | Muir et al. | 123/90.17 |

FOREIGN PATENT DOCUMENTS

| 340821 | 11/1989 | European Pat. Off. | 123/90.17 |
| 2-27506 | 9/1990 | Japan | 123/90.17 |

Primary Examiner—E. Rollins Cross
Assistant Examiner—Weilun Lo
Attorney, Agent, or Firm—F. M. Sajovec

[57] ABSTRACT

A phase change device mounted on a camshaft of an internal combustion engine. The phase change device is mounted on an outwardly extending portion of the camshaft outside of the engine block and receives lubricating engine oil from the oil supply of the engine. A simplified sealing arrangement is provided, requiring only a lip seal acting between the engine block and the input member of the phase change device and a cap over the end of the camshaft. Also provided is a bearing supporting the input member on the camshaft.

7 Claims, 2 Drawing Sheets

PHASE CHANGE DEVICE

This invention relates to a device for varying the angular phase relation between two rotating shafts. More specifically, the invention relates to such a device adapted to vary the angular phase relation between the crankshaft and a camshaft of an internal combustion engine.

Devices for varying or changing the angular phase relation or timing between an engine camshaft and crankshaft are well known, as may be seen by reference to U.S. Pat. Nos. 4,754,727 and 4,841,924 which are both assigned to the assignee of this patent.

U.S. patent application Ser. No. 519,696 filed May 7, 1990, now U.S. Pat. No. 5,031,585 discloses a device similar to the device herein and similar to the devices shown in the above patents, i.e. all include an axially displaceable advancing plate drivingly interconnecting support and drive members via lugs or splines. The advancing plate is also threadably mounted on a drum for axial displacement along the drum in response to relative rotation between the drum and plate. Relative rotation in one direction is provided by a spring reacting between the hub and drum, and in the other direction by selective application of a frictional force for retarding rotation of the drum counter to the spring force. Said application is assigned to the assignee of this application and is incorporated herein by reference.

Referring to U.S. Pat. No. 4,841,924, there is disclosed a phase change device which is particularly adapted for use in an engine wherein the camshaft is driven by means of a toothed belt which cannot be exposed to engine oil. Accordingly, that device is mounted external to the engine and includes a self-contained oil supply, requiring a number of sealing elements to prevent oil leakage.

The device disclosed in U.S. Pat. No. 5,031,585 is mounted within the engine and includes an electromagnetic brake which operates in a wet mode using engine lubricating oil.

It is an object of the present invention to provide a phase change device which incorporates a wet brake operating on engine oil, and which is adapted to be driven by a toothed belt Such combination requires that the phase change device be mounted external to the engine while utilizing engine oil in the wet brake element and for lubrication.

A further object of the invention is to provide a phase change device as above which requires a minimum number of sealing elements, and particularly the number of dynamic sealing elements, which results in reduced actuation forces and reduced manufacturing cost.

A further object of the invention is to provide a phase change device mounted outboard of the engine with improved means to support belt loads and thus minimize friction and deflection.

To meet the above objectives, the present invention provides a phase change device mounted outside the engine which includes a lip seal acting between the input member of the phase change device and the engine and a sealed cover assembly to contain the engine oil used in the operation of the wet brake of the phase change device. Also provided is a bearing supporting the input member on the camshaft. A particular advantage of this construction is that it requires the engine designer to make only minimal modifications to cylinder head geometry to incorporate the phase change device. Also, the phase change device is very compact and the space occupied by the phase change device within the engine compartment is little more than that required by the toothed pulley driving the camshaft.

Figure 2:
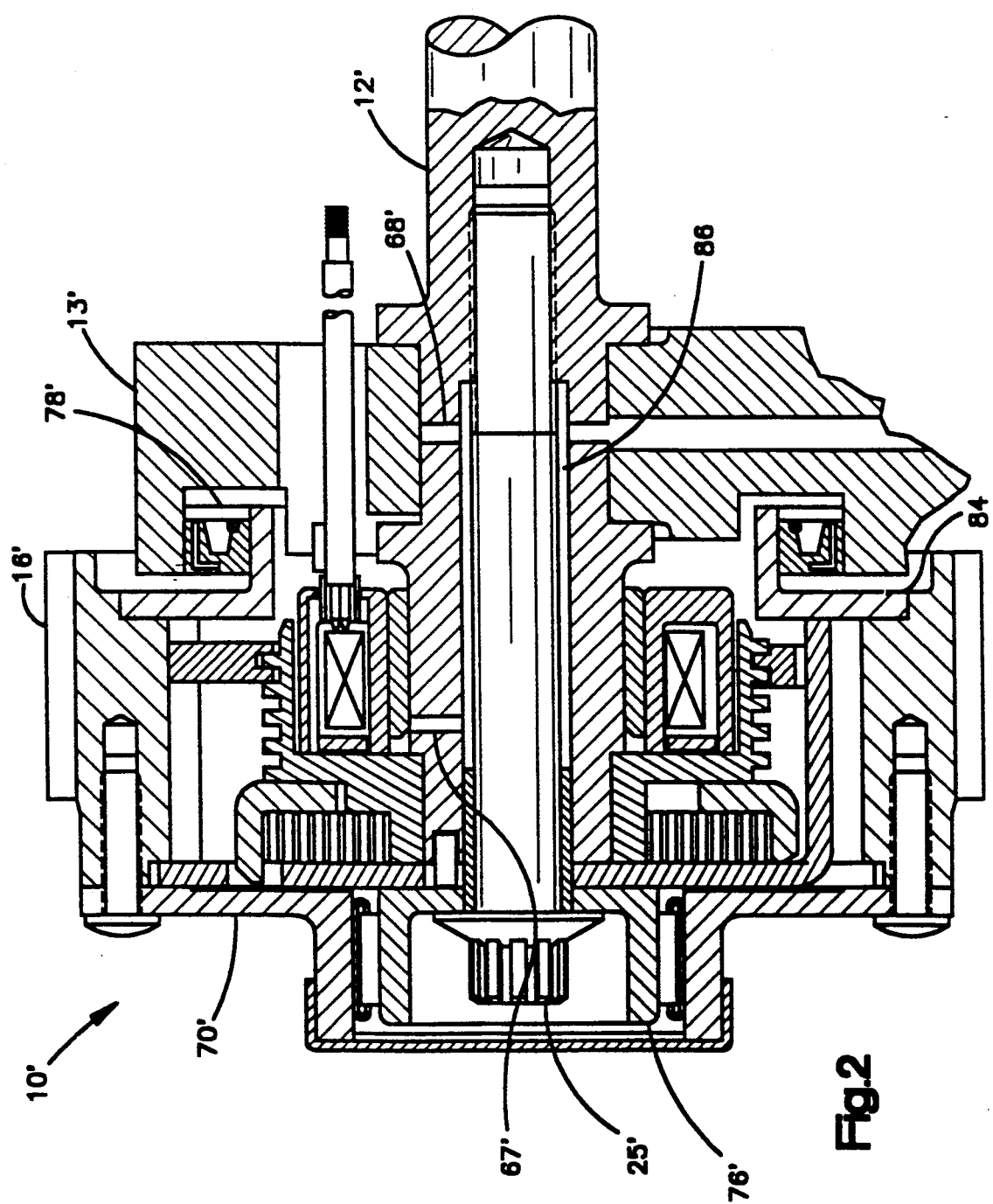

Additional objectives and advantages will be apparent from the following description when considered in connection with the accompanying drawings, wherein:

FIG. 1 is a sectional view of the phase change device including the invention; and FIG. 2 is a sectional view of another embodiment of the invention.

Referring to the drawings, there is illustrated an angular phase change device 10 adapted to be fixed to and rotate about a camshaft 12 of an internal combustion engine 13. As is well known in the art, the engine includes a crankshaft which rotates the device 10 and camshaft 12. The camshaft controls the opening and closing of the intake and/or exhaust valves of the engine in known manner. Device 10 includes a hub 14 mounted for rotation with the camshaft 12; a drive member 16 which is driven by the engine crankshaft or by a second camshaft, and which is engaged with the hub 14 in a variable phase relationship therewith; an advancing plate 18 which interconnects the drive member 16 and the hub 14; and a drum 20 which interacts with the hub 14 and the advancing plate 18 and which when retarded by a brake assembly 22 is operable to effect axial movement of the advancing plate, which movement effects a change in the phase relationship between the drive member and the hub as will be described in detail below. The drum is supported for rotation on the camshaft 12; as is the brake assembly, the brake assembly being supported by a bearing 24.

The hub 14 is an essentially flat plate which is located radially by means of a sleeve 15 which is received in a counterbore formed in the end of the camshaft and indexed angularly with the camshaft by means of a pin 26. A threaded fastener 25 clamps the hub to the camshaft. As illustrated in more detail in application Ser. No. 519,696, which has been incorporated herein by reference, the hub has three lugs 30 formed thereon extending axially with respect to the camshaft and received in corresponding slots formed in the advancing plate 18. The interfacing surfaces between the lugs 30 and the slots are formed at an angle to provide relative angular movement between the hub and the drive member when the advancing plate is moved axially as described in U.S. Pat. Nos. 4,754,727 and 4,841,924.

The drive member 16 is the input to the phase change device 10, and is illustrated herein as a toothed pulley. The drive member is supported for limited relative rotation with respect to the hub, and includes three lugs 34 which are received in corresponding slots formed in the advancing member 18 angularly offset from the slots which receive the lugs 30. The interfacing surfaces between the lugs 34 and the slots provide positive angular engagement between the drive member 16 and the advancing member 18 while permitting relative axial movement therebetween.

The drum 20 comprises an axially extending portion 21 mounted for rotation on the camshaft, a radially extending portion 23 which also functions as a brake disc as will be described below, and a drum portion which has external threads 27 formed thereon in engagement with corresponding internal threads formed on the advancing plate 18.

In accordance with the known operation of the phase change device, the axial movement of the advancing plate 18 which results in relative angular rotation between the drive member 16 and the hub 14 is produced by retarding the rotation of the drum 20 with respect to the hub 14. The drum 20 and the hub 14 are interconnected by means of an inner stop element 42 which is integral with the drum, an outer stop member 44 which is fixed to the hub 14, and a clockspring 46 acting between the hub and the drum. The outer stop 44 is a shallow cup-shaped member having three lugs 50 formed thereon which are received in apertures formed in the hub. The outer end of the spring 46 is fixed to the outer stop member 44, and the inner end of the spring is fixed to the drum.

Relative rotation between the drum and the outer stop member 44 is limited to slightly less than 360° by means of interengaging tabs (not shown) formed on the drum and on the outer stop member 44. The spring 46 effectively connects the drum and the outer stop member and normally biases the drum 20 relative to the hub 14 into the position shown in FIG. 1 wherein the advancing plate 18 is advanced along the threads 27 to its rightwardmost position relative to the drum 20, the drive member 16 and the hub 14.

When a change in the phase relationship between the crankshaft and camshaft is desired, the rotation of the drum 20 is retarded relative to the hub 14 and against the force of spring 46, such retardation causing the advancing member 18 to rotate relative to the hub, and thus causing it to move axially leftward along the threads as viewed in FIG. 1. As described above, such axial movement of the advancing member causes, by virtue of angled contact surfaces formed on the advancing member and on the lugs 30 of the drive member, the drive member to rotate relative to the hub, thus effectively changing the phase relationship between the crankshaft and the camshaft.

The retarding force applied to the drum is provided by a brake assembly 51 comprising a housing 56 in the form of an annular channel member, a coil 58 received within the housing, an annular backing plate 60 to which is bonded a friction plate and which is press fit or staked into the housing, and a face formed on the drum 20. The brake is mounted by means of a bracket 62 which fixes the housing against rotation relative to the engine 13, but which permits limited axial movement.

The brake assembly 51 operates in a wet mode, being supplied with engine oil. Referring to FIG. 1, the camshaft is counterbored to provide an oil passage 64 which communicates with a counterbore 65 formed in the fastener 25. A cross bore 66 formed in the fastener 25 communicates with a cross bore 67 in the camshaft to provide oil to the brake assembly. A second cross bore 68 formed in the camshaft intersects a passage 69 in the engine block 13 which communicates with the engine oil supply.

Since the brake assembly 51 is not positively restrained axially, in normal operation, i.e. with the clutch deenergized, the friction disc is separated from the brake disc surface of the drum surface by a film of engine oil. When the coil 58 is energized, the housing 56 is attracted to the drum 20, which is effective to press the friction disc against the brake disc surface of the drum with sufficient force to overcome the force of spring 46 and thus retard the rotation of the drum to initiate the phase-changing axial movement of the advancing plate 18 as described above. Since the opposing force of the spring is proportional to the relative angular displacement of the drum, the retarding force applied by the coil and the resulting degree of axial movement of the advancing plate are proportional to the current applied to the coil. Accordingly, the degree of phase change obtainable is proportional to the current applied to the coil and is infinitely variable between the limits of axial movement of the advancing plate.

In accordance with the invention, the phase change assembly 10 is mounted in front of the engine block on an extended portion of the camshaft and is constructed such that the phase change mechanism is effectively enclosed within the input member, i.e. the toothed belt pulley 16. To this end, the pulley 16 includes a hub portion 80 which extends within a counterbore 81 formed in the end of the engine block, and the outer end of the phase change assembly 10 is enclosed by means of an endplate 70 attached to the pulley by screws 72, and an endcap 82 press fit to a hub portion 74 of endplate 70. A lip seal 78 is received in the counterbore 81 and acts on the hub portion 80. Additional sealing is provided by means of a sealant coating applied between the drive member 16 and the endplate, and by the endcap 82.

To provide increased bearing support for the drive member 16, a needle bearing 75 is received between the hub portion 74 of the endplate and an inner race member 76 which is radially located on the sleeve 15 and clamped to the camshaft by the fastener 25.

FIG. 2 illustrates an alternative embodiment of the invention wherein the seal 78 is received between the engine 13 and a collar 84 press fit or otherwise fixed to the input member 16. Such placement of the seal permits the use of a seal of smaller diameter than that of FIG. 1 embodiment with attendant improvement in seal durability.

Another variation in the FIG. 2 embodiment is in the design of the fastener 25 wherein it is elongated as compared with the FIG. 1 embodiment and wherein an annular channel 86 is formed between the unthreaded shank portion of the fastener and the camshaft bore to define an oil path between the cross bore 67 and the cross bore 68.

We claim:

1. In an internal combustion engine comprising a housing and a camshaft mounted for rotation within said housing, a phase change device comprising an input member supported for rotation on said camshaft; an output member fixed to said camshaft; advancing means interconnecting the input and output members, said advancing means being operative upon axial movement to effect limited relative rotation between the input and output members; drum means supported for rotation on said camshaft and engaged with said advancing means to effect said axial movement of said advancing means when a retarding force is applied to said drum means; actuating means operable to apply said retarding force; and means conducting engine lubricating oil to said actuating means; the improvement comprising a fluid sealing element acting between said housing and said input member.

2. Apparatus as claimed in claim 1, in which said sealing element comprises a lip seal received in a counterbore formed in said housing and said input member includes an axially extending portion, said lip seal including a lip element contacting said axially extending portion.

3. Apparatus as claimed in claim 2, in which said axially extending portion is formed integrally with said input member.

4. Apparatus as claimed in claim 2, in which said axially extending portion comprises a substantially tubular member fixed to said input member.

5. Apparatus as claimed in any one of claims 1 through 4 including bearing means supporting said input member on said camshaft.

6. Apparatus as claimed in claim 5 including fastener means received in an axial bore formed in the outboard end of said camshaft, a substantially tubular bearing race member fixed to said camshaft by said fastener, a plate fixed to the outboard end of said input member, said plate having an outwardly extending hub portion found thereon; and annular bearing means received between said bearing race member and the hub portion of said plate.

7. Apparatus as claimed in claim 6, wherein said plate is in sealing engagement with said input member, said apparatus further including an end cap sealingly received over the hub portion of said plate.

* * * * *